United States Patent
Patapoutian

(10) Patent No.: US 7,466,782 B1
(45) Date of Patent: Dec. 16, 2008

(54) METHODS, APPARATUS AND COMPUTER PROGRAM PRODUCTS FOR DETERMINING THE TIMING OF BITS BASED ON FREQUENCY ERROR

(75) Inventor: Ara Patapoutian, Hopkinton, MA (US)

(73) Assignee: Maxtor Corporation, Longmont, CO (US)

( * ) Notice: Subject to any disclaimer, the term of this patent is extended or adjusted under 35 U.S.C. 154(b) by 661 days.

(21) Appl. No.: 10/873,103

(22) Filed: Jun. 21, 2004

Related U.S. Application Data

(60) Provisional application No. 60/542,648, filed on Feb. 5, 2004.

(51) Int. Cl.
*G11B 5/09* (2006.01)
(52) U.S. Cl. .......................... 375/355; 360/51
(58) Field of Classification Search ............... 375/355, 375/326, 224, 225, 226, 227, 228; 360/55, 360/48, 51, 77.08, 65, 53; 713/503, 400, 713/500, 600; 369/59.21
See application file for complete search history.

(56) References Cited

U.S. PATENT DOCUMENTS

| | | | | |
|---|---|---|---|---|
| 6,009,549 A | * | 12/1999 | Bliss et al. | 714/769 |
| 6,157,604 A | * | 12/2000 | Feyh et al. | 369/59.21 |
| 6,236,343 B1 | | 5/2001 | Patapoutian | 341/111 |
| 6,307,696 B1 | * | 10/2001 | Bishop et al. | 360/51 |
| 6,369,969 B1 | * | 4/2002 | Christiansen et al. | 360/66 |
| 6,566,922 B1 | * | 5/2003 | Schell et al. | 327/156 |
| 6,615,361 B1 | | 9/2003 | Patapoutian | 713/503 |
| 6,714,603 B2 | * | 3/2004 | Ashley et al. | 375/326 |
| 6,728,894 B2 | | 4/2004 | McEwen et al. | 713/503 |
| 7,035,029 B2 | * | 4/2006 | Sawada et al. | 360/51 |
| 7,054,398 B1 | * | 5/2006 | Wu et al. | 375/354 |
| 7,203,017 B1 | * | 4/2007 | Sutardja et al. | 360/51 |
| 2002/0087910 A1 | | 7/2002 | McEwen et al. | 713/503 |
| 2002/0094048 A1 | * | 7/2002 | Simmons et al. | 375/362 |
| 2003/0137765 A1 | * | 7/2003 | Yamazaki et al. | 360/39 |

OTHER PUBLICATIONS

Masaru Sawada, Motomu Takatsu, Takao Sugawara and Toshihiko Morita, A Signal Interpolated Timing Recovery System with Frequency Offset Detector, IEEE Transactions on Magnetics, vol. 39, No. 5, Sep. 2003.*

Mark Sprubeck and Richard T. Behrens, "Interpolated Timing Recovery for Hard Disk Drive Read Channels" Cirrus Logic, Colorado, 1997 IEEE.*

* cited by examiner

*Primary Examiner*—Chieh M Fan
*Assistant Examiner*—Aristocratis Fotakis
(74) *Attorney, Agent, or Firm*—Myers Bigel Sibley & Sajovec, P.A.

(57) ABSTRACT

Determining timing for bits in sampled data includes determining a bit error in the sampled data, determining a phase error in the sampled data, determining a frequency error of the sampled data based on the bit error and based on the phase error, and determining the timing for bits in the sampled data based on the determined frequency error.

33 Claims, 5 Drawing Sheets

METHODS, APPARATUS AND COMPUTER PROGRAM PRODUCTS FOR DETERMINING THE TIMING OF BITS BASED ON FREQUENCY ERROR

RELATED APPLICATION

This application claims the benefit of and priority to U.S. Provisional Patent Application No. 60/542,648, filed Feb. 5, 2004, the disclosure of which is hereby incorporated herein by reference as if set forth in its entirety.

FIELD OF THE INVENTION

The present invention generally relates to sampled data systems and, more particularly, to methods, apparatus, and computer program products for determining timing of bits in a data signal.

BACKGROUND OF THE INVENTION

In a disk drive, an analog signal is read from a storage medium, such as a computer hard disk, and is digitized using an analog-to-digital (A/D) converter. The resulting asynchronous digital data is stored in a buffer, from which the asynchronous digital data is sampled. A clock signal controls the sampling to produce synchronous digital data. If the clock signal is out of phase with the synchronous digital data, errors may result in the output digital data.

SUMMARY OF THE INVENTION

Some embodiments of the present invention provide methods of determining timing for bits in sampled data. A bit error is determined for the sampled data. A phase error is determined for the sampled data. A frequency error of the sampled data is determined based on the bit error and based on the phase error. The timing for bits in the sampled data is then determined based on the determined frequency error.

In some further embodiments of the present invention, the frequency error may be determined by combining the bit error, the phase error, and a number of bits between first and second locations in the sampled data to determine the frequency error. For example, the frequency error may be determined by adding the bit error and the phase error to generate a result, and multiplying the result by an inverse of the number of bits between the first and second locations in the sampled data to determine the frequency error. The bit error may be determined by detecting a number of bits between the first and second locations in the sampled data, and comparing the detected number of bits and a predetermined number of bits between the first and second locations to determine the bit error.

In some further embodiments of the present invention, the sampled data may include first mark bits and second mark bits. The first location may correspond to a location of the first mark bits, and the second location may correspond to a location of the second mark bits. The predetermined number of bits may then be based on a predetermined number of bits between the first mark bits and the second mark bits. The number of bits between the first and second locations in the sampled data may be determined by detecting the first mark bits, detecting the second mark bits, and determining the number of bits between the first and second mark bits. The first mark bits and/or the second mark bits may be detected by searching the sampled data for at least one predetermined symbol sequence that corresponds to the first mark bits and/or the second mark bits.

Some embodiments of the present invention provide an apparatus for determining timing for bits in sampled data. The apparatus includes a frequency error estimator and a timing estimator. The frequency error estimator is configured to determine a bit error in the sampled data, to determine a phase error in the sampled data, and to determine a frequency error of the sample data based on the bit error and based on the phase error. The timing estimator is configured to determine the timing for bits in the sampled data based on the determined frequency error.

Some embodiments of the present invention provide a computer program product for determining timing for bits in sampled data. The computer program product includes program code that is configured to determine a bit error in the sampled data, to determine a phase error in the sampled data, to determine a frequency error of the sampled data based on the bit error and based on the phase error, and to determine the timing for bits in the sampled data based on the determined frequency error.

The details of one or more embodiments of the invention are set forth in the accompanying drawings and the description below. Other features and advantages of the invention will be apparent from the following description, drawings and claims.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

The present invention may be embodied as apparatus, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

The present invention is described below with reference to block diagrams and/or operational illustrations of apparatus, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
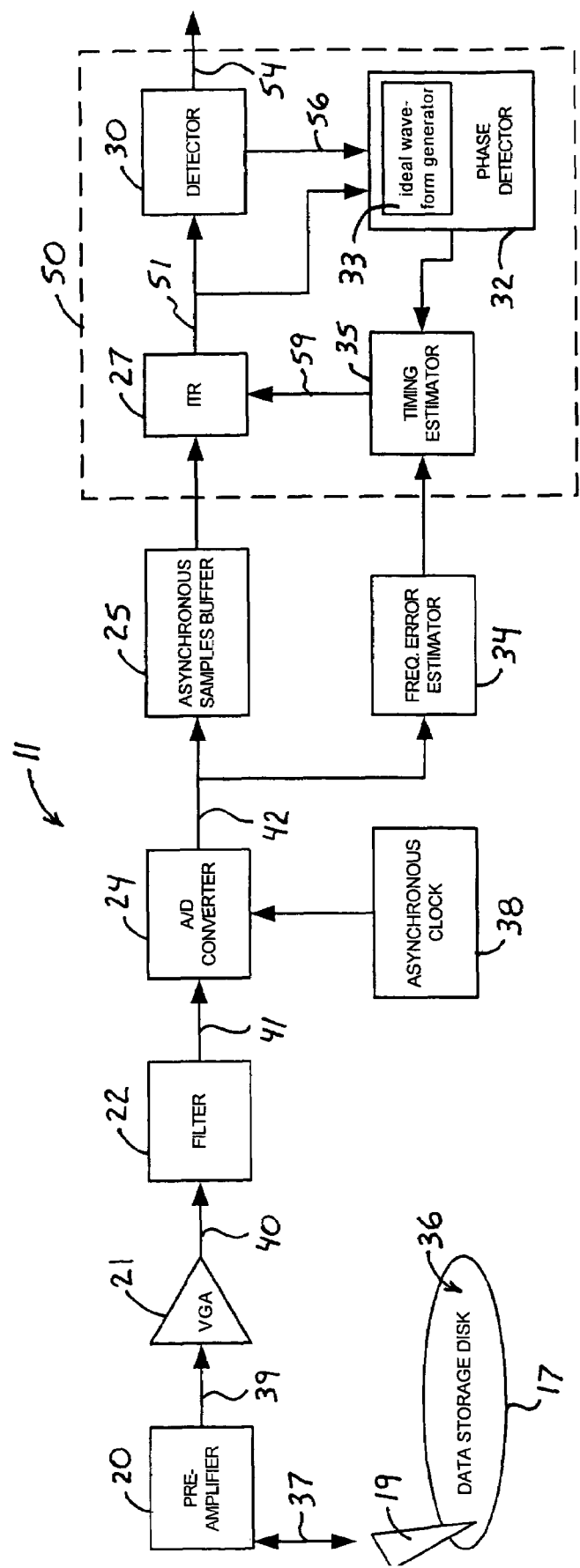
FIG. 1 is a block diagram showing representative components of a disk drive according to some embodiments of the present invention.

FIG. 1 shows a disk drive 11 that includes a data storage disk 17, a transducer head 19, a pre-amplifier 20, an analog variable gain amplifier (VGA) 21, a filter 22, an A/D (Analog-to-Digital) converter 24, an asynchronous samples buffer 25, an interpolated timing recovery circuit (ITR) 27, a detector 30, a phase detector 32, a frequency error estimator 34, a timing estimator 35, and an asynchronous clock 38. The foregoing circuitry may be implemented as one or more circuit elements, such as an ASIC (Application-Specific Integrated Circuit) or logic gates, and which may be in combination with software.

Figure 2:
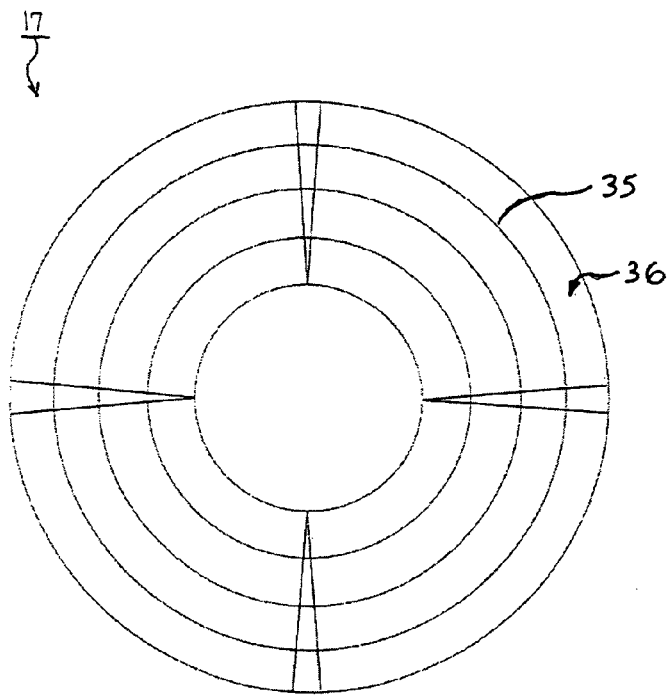
FIG. 2 is a top view of a computer storage disk in the disk drive.

The data storage disk 17 may be a magnetic disk, optical disk, or any other type of storage disk, and which may have data storage tracks defined on one or both of its storage surfaces. A close-up view of data storage tracks 35 is shown in FIG. 2. The data storage disk 17 is rotated inside disk drive 11 while data is read from, and may be written to its tracks. Although only one data storage disk 17 is shown, more than one disk may be included in the disk drive 11.

Transducer head 19 may be a giant magneto-resistive head (GMR), or similar device, that is configured to read data from the data storage disk 17, and may further be configured to write data to the disk 17. Transducer head 19 is associated in a "flying" relationship adjacent to a storage surface 36 of disk 17, where it is movable relative to, and over, storage surface 36 in order to read and/or write data on storage surface 36.

During reading from a magnetic type disk 17, head 19 senses flux transitions as it "flies" in close proximity to a selected channel on disk 17. These flux transitions 37 are provided to pre-amplifier 20. Pre-amplifier 20 is a voltage pre-amplifier that amplifies the flux transitions from millivolts (mV) to volts (V). Resulting pre-amplified analog signal ("read signal") 39 is provided to VGA 21. VGA 21 amplifies read signal 39 and provides a resulting amplified read signal 40 to filter 22. Filter 22 is an analog filter that equalizes amplified read signal 40. To this end, filter 22 is programmed in accordance with the data transfer rate of a data zone on disk 17 from which the signal 40 originated. Resulting filtered signal 41 is subjected to sampling (including possible oversampling) and quantization within high-speed A/D converter 24. A/D converter 24 outputs digitized asynchronous data 42 generated from signal 41.

Figure 3:
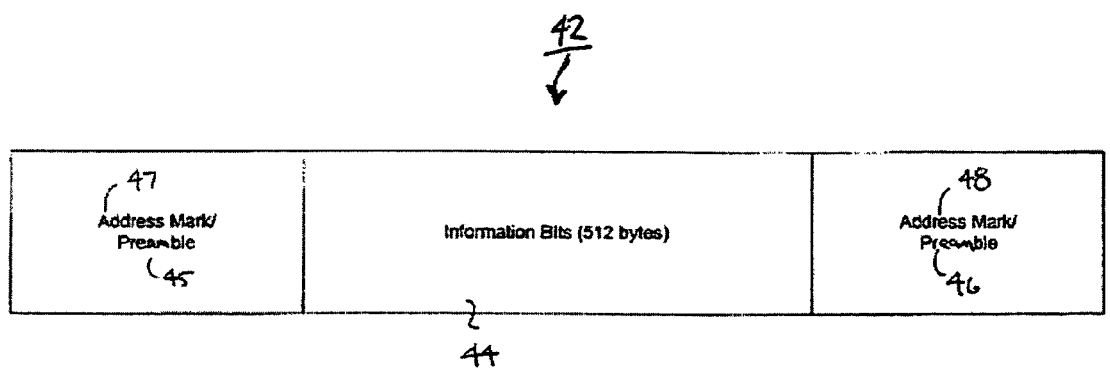
FIG. 3 is a diagram of a frame of data stored on/read from the computer storage disk.

The digitized asynchronous data 42 is stored in asynchronous samples buffer 25. The data 42 and buffer 25 are labeled "asynchronous" because they are not formed by, or part of, a feedback loop/PLL 50. As will be appreciated to one having skill in the art, the digitized asynchronous data 42 may, and likely will, be different than what is stored on the disk 17 due to sampling errors. The PLL 50 is used to reduce the phase difference (or "phase error") between synchronous digital data and a clock signal. The asynchronous data 42 can include first and second mark bits that indicate locations within the asynchronous data 42. For example, FIG. 3 shows asynchronous data 42 that includes information bits 44 (e.g., data), with preambles 45 and 46 and address marks (AM) 47 and 48 at the beginning and end of the information bits 44.

Information bits may be stored by the disk drive 11 in frames/packets. An address mark may be a string of bits at the beginning and end of the information bits that indicates the beginning and end of a frame. A preamble may be a string of "phase" bits adjacent to the address marks, which can indicate the phase of the asynchronous data 42. More particularly, the phase bits may define a sinusoidal function having a phase that corresponds to the phase of the asynchronous data 42 that is generated by reading the information bits 44. The preamble 45 at the beginning of the information bits 44 may have a different phase than the preamble 46 at the end of the asynchronous data 42 due to, for example, mechanical and/or electrical irregularities in the disk drive 11 while writing and/or reading the information bits 44 on the disk 17. The difference between the phase of preamble 45 and the phase of preamble 46 defines the phase error of the asynchronous data 42, as described below.

ITR 27 samples the asynchronous data 42 from the asynchronous samples buffer 25 based on a clock signal 59 to generate synchronous data 51. The clock signal 59 is generated by the timing estimator 35 (described below). The sampled asynchronous data 42 from the ITR 27 is referred to as "synchronous" data 51 because it is sampled as part of the feedback loop/PLL 50.

Detector 30 performs detection operations on the synchronous data 51. The detector 30 may be, for example, a Viterbi detector that decodes (i.e., removes) intersymbol (ISI) interference in the synchronous data 51 and determines the identity of bits therein. Other detectors for detecting codes, timing and/or inter-symbol interference (ISI) may be included after the detector 30. Iterative operations may be performed between such detectors to improve the detection of the codes, timing and/or ISI. For example, detector 30 can determine whether a bit is a logic "1" or a logic "0" based on other bits within the synchronous data 51. The accuracy of such bit decisions may be improved by using a longer portion of the synchronous data 51.

When identifying the bits, detector 30 may make both "final" bit decisions 54 and "fast" bit decisions 56. Accuracy is more important than speed in the final bit decisions, whereas speed is more important than accuracy in the fast bit decisions. There are two reasons for this. First, the final bit decisions are used in generating the output of disk drive 11 and, therefore, should be as accurate as possible. Second, the fast bit decisions are used in the feedback loop/PLL 50 to improve timing; hence, time delays should be reduced as much as possible. The fast bit decisions, unlike the final bit decisions, are therefore made more quickly and may be without common noise reduction processing. Typically, the fast bit decisions do not take into account much data (e.g., 4 bits) following the current bit. By contrast, the final bit decisions take into account larger amounts of data (e.g., 20 bits) following the current bit, resulting in a more accurate bit determination. It is noted that if the output of detector 30 is buffered, the final bit decisions 54 may be used in place of the fast bit decisions 56.

Phase detector 32 receives bit decisions 56 from detector 30, along with the synchronous data 51. Phase detector 32 determines phase errors (i.e., phase differences) between the bit decisions 56 and the synchronous data 51 for a frame of the asynchronous data 42 (FIG. 3). The phase errors may be, for example, determined by generating an "ideal" waveform from the bit decisions 56 and comparing that ideal waveform to an "actual" waveform generated from the synchronous data 51 (the "original" data). An amplitude error is determined based on a difference between the two waveforms at a point in time, a slope is determined at the time, and the phase error is determined based on a multiplication of the slope and the amplitude error. The phase error is output to the timing estimator 35, which can use it to correct the phase of the clock signal 59 that is output to ITR 27.

The frequency error estimator 34 determines a frequency error (i.e., frequency variation) in a frame of the asynchronous data 42. The frequency error is output to the timing estimator 35, which can be used in combination with the phase error from the phase detector 32 to correct the phase of the clock signal 59 that is output to ITR 27.

Figure 4:
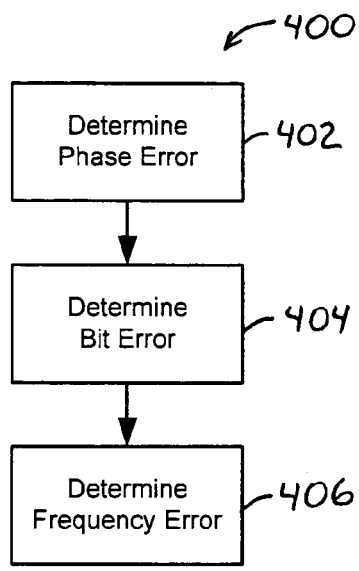
FIG. 4 is a flowchart showing a process for determining a frequency error based on phase error and bit error in data read by the disk drive according to some embodiments of the present invention.

Referring now to FIG. 4, a process 400 is shown for determining the frequency error of asynchronous data, such as the asynchronous data 42 (FIG. 3), and which may be performed by the frequency error estimator 34 according to some embodiments of the present invention. A phase error is determined (402) based on the asynchronous data 42. A bit error is determined (404) based also on the asynchronous data 42. A frequency error is then determined (406) based on the phase error, the bit error, and a predetermined number of bits in a frame of the asynchronous data 42. The predetermined number of bits in a frame of the asynchronous data 42 corresponds to the number of bits that were stored on the disk 17 (512 bytes shown in FIG. 3), and is therefore a known value.

Process 400 may be carried out while the asynchronous data 42 is being generated by the A/D converter 24 and stored in the asynchronous samples buffer 25. Process 400 may be performed at any time to determine the frequency error; however, it may be particularly advantageous if it is performed prior to the start of the generation of the synchronous data 51 by the ITR 27. This is because the frequency error determined by process 400 can be used by the timing estimator 35 to generate a more accurate clock signal 59 for use by the ITR 27.

Figure 5:
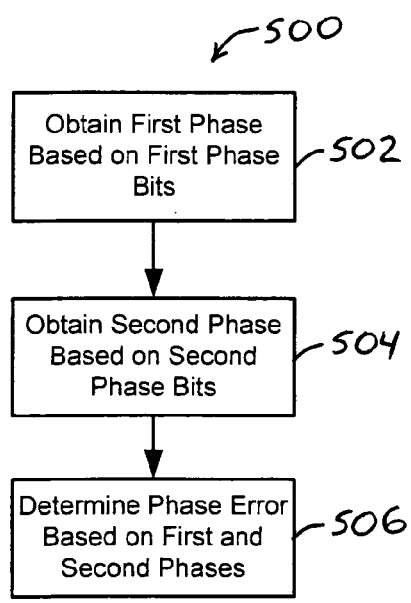
FIG. 5 is a flowchart showing a process for determining the phase error in the data according to some embodiments of the present invention.

Referring now to FIG. 5, a process 500 is shown for determining the phase error based on the asynchronous data 42, and which may be performed at Block 402 in process 400 according to some embodiments of the present invention. Process 500 obtains (502) a first phase of a data frame (e.g., asynchronous data 42) based on first phase bits (e.g., preamble 45, FIG. 3) at the beginning of the data frame. This defines the initial phase of the data frame. Process 500 obtains (504) a second phase based on second phase bits (e.g., preamble 46, FIG. 3) at the end of the data frame. This defines the final phase of the data frame. The "start" and "end" preambles may be obtained using, for example, a zero phase start (ZPS) algorithm. Process 500 determines (506) the phase error for the data frame using the first and second phases. For example, the phase error may be determined by subtracting and/or otherwise combining the second phase and the first phase.

It is noted that while some embodiments of the present invention have been illustrated using two preambles at the beginning and end of a data frame, it is to be understood that more than two preambles may be used without departing from the scope of the present invention. For example, one or more preambles may be included within the data frame itself, which may enable the frequency error estimator 34 to determine and use various different phases. Interpolations may then be performed between the phases at each preamble, which, since they can be closer, may provide for a more accurate phase error determination and frequency error determination.

Figure 6:
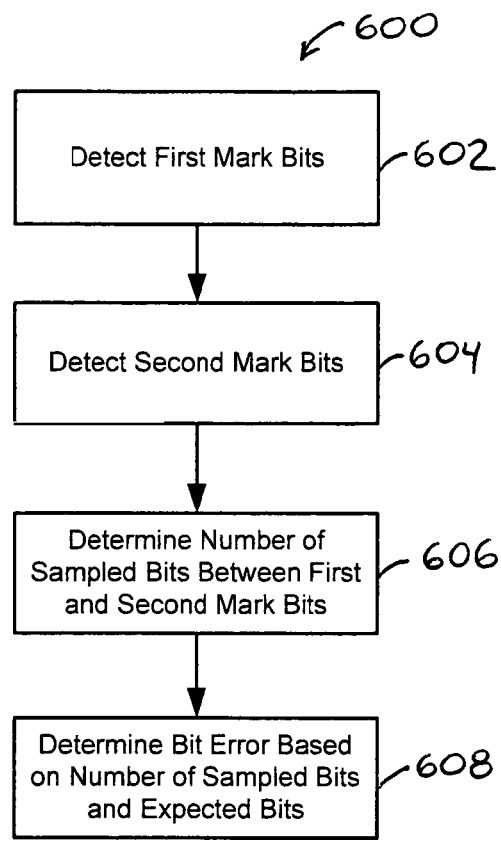
FIG. 6 is a flowchart showing a process for determining the bit error in the data according to some embodiments of the present invention.

Referring now to FIG. 6, a process 600 is shown for determining the bit error based on the asynchronous data 42, and which may be performed at Block 404 in process 400 according to some embodiments of the present invention. Process 600 detects (602) first mark bits (e.g., AM bits 47, FIG. 3) in the data frame. Process 600 also detects (604) second mark bits (e.g., AM bits 48, FIG. 3) in the data frame. A number of bits that have been sampled between the first and second mark bits is determined (606). For example, the number of sampled bits can be counted in the asynchronous data 42 from the A/D converter 24 (FIG. 1). As will be appreciated by one who is skilled in the art, although the counted samples be different than the number of sample bits due to, for example, oversampling, the number of sampled bits may be determined based on the sampling rate and the counted samples. The bit error is then determined (608) based on the determined number of sampled bits and a predetermined number of bits between the first and second mark bits. The predetermined number of bits can be, for example, the number of bits that were stored on the disk 17 between the mark bits in the data frame, which is a known number. Accordingly, the bit error can be determined by subtracting, or otherwise combining, the determined number of sampled bits and the predetermined number of bits.

Figure 7:
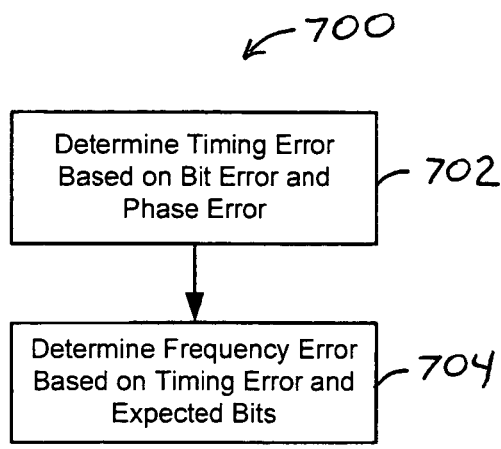
FIG. 7 is a flowchart showing a process for determining the frequency error based on the timing error and predetermined bits in the data according to some embodiments of the present invention.

Referring now to FIG. 7, a process 700 is shown for determining the frequency error based on the bit error, the phase error, and the predetermined number of bits in the data frame, and which may be performed at Block 406 in process 400 according to some embodiments of the present invention. Process 700 determines (702) a timing error of the data frame based on the bit error and the phase error, by, for example, adding or otherwise combining the bit and phase errors. The frequency error is then determined (704) based on the timing error and the predetermined number of bits between the first and second mark bits. For example, the frequency error may be determined by dividing the timing error by the predetermined number of bits. Because the predetermined number of bits may not vary from data frame to data frame, an inverted representation of that number may be retained and multiplied with the timing error. By multiplying instead of dividing, less microprocessor cycles and/or less circuit complexity may be needed to determine the frequency error.

Figure 8:
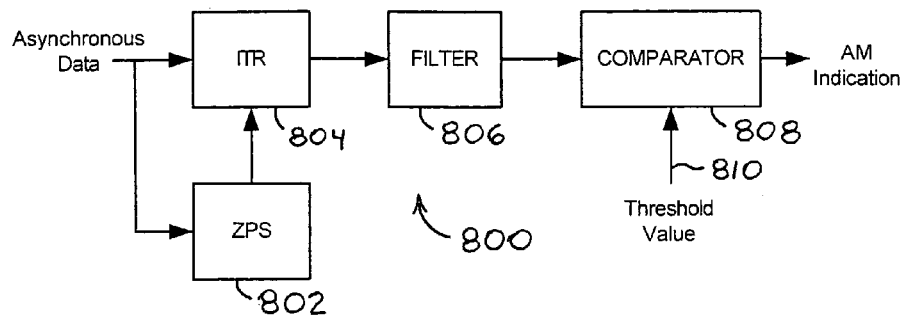
FIG. 8 is a block diagram showing representative components of a mark bit detector according to some embodiments of the present invention.

Referring now to FIG. 8, a block diagram is shown of a mark bit detector 800 which may be used to detect the mark bits (e.g., AM bits 47 and 48 in FIG. 3) in data of the data frame, and which may be used in Blocks 602 and/or 604 in FIG. 6, according to some embodiments of the present invention. The AM detector 800 includes a ZPS 802, an ITR 804, a filter 806, and a comparator 808. The ZPS 802 determines first and second phases of the asynchronous data 42 using the first and second phase bits (e.g., preamble bits 45 and 46 in FIG. 4). The ITR 804 generates synchronous data based on the asynchronous data 42 and the relative phases from the ZPS 802. The filter 806 filters the synchronous data from the ITR 804 to generate filtered data, which is compared to a threshold value 810 by the comparator 808. The comparator 808 generates an indication of when the mark bits are located based on a comparison of the filtered data to the threshold value 810. For example, the filter 806 may include a finite impulse response (FIR) filter with fixed coefficients that are selected based on at least one predetermined symbol sequence that corresponds to at least one of the first and second mark bits. Accordingly, the filter 806 can be configured so that its filtered data output increases beyond the threshold value 810 when the mark bits in the synchronous data from the ITR 804 are filtered. In this manner, the mark bit detector 800 can search the sampled data for at least one predetermined symbol sequence that corresponds to at least one of the first and second mark bits.

The ITR 804 may include the same algorithm and/or device as the ITR 27 that is shown in FIG. 1. In particular, with reference to FIGS. 1 and 8, because the asynchronous data provided to the ITR 27 is buffered by the asynchronous samples buffer 25, and the asynchronous data provided to the mark bit detector 800 may not be buffered, the ITR 27 may be configured to selectively generate asynchronous samples for the filter 806 using the asynchronous data from the A/D converter 24, and to selectively generate synchronous samples for the detector 30 and phase detector 33 based on the asynchronous data from the asynchronous samples buffer 25.

Figure 9:
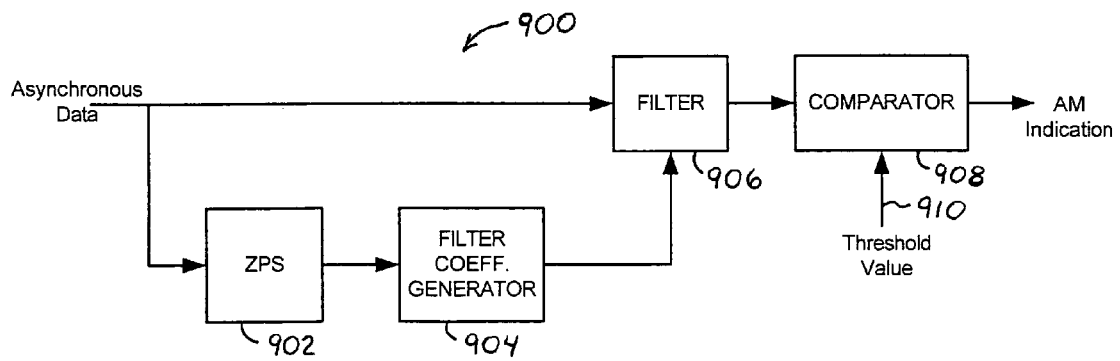
FIG. 9 is a block diagram showing representative components of a mark bit detector according to some other embodiments of the present invention.

Referring now to FIG. 9, a block diagram is shown of another mark bit detector 900 which may be used to detect the mark bits in data of the data frame (e.g., AM bits 47 and 48 in FIG. 3), and which may be used in Blocks 602 and/or 604 in FIG. 6, according to some other embodiments of the present invention. The AM detector 900 includes a ZPS 902, a filter coefficient generator 904, a filter 906, and a comparator 908. The ZPS 902 determines first and second phases of the asynchronous data 42 using the first and second phase bits (e.g., preamble bits 45 and 46 in FIG. 3). The filter coefficient generator 904 generates coefficients for the filter 906 based on the relative phases from the ZPS 902. For example, the filter coefficient generator 904 may include a look-up table that contains phases and corresponding coefficients.

The filter 906 may be a FIR filter that filters the asynchronous data 42 using the coefficients from the generator 904 to generate filtered data. The comparator 908 generates an indication of when the mark bits are located based on a comparison of the filtered data to a threshold value 910. The filter coefficient generator 904 may generate the coefficients based on the relative phases and the known symbol sequence of the mark bits so that the filtered data from the filter 906 is increased beyond the threshold value 910 when the mark bits are filtered by the filter 906. In this manner, the mark bit detector 900 can search the sampled data for at least one predetermined symbol sequence that corresponds to at least one of the first and second mark bits.

Figure 10:
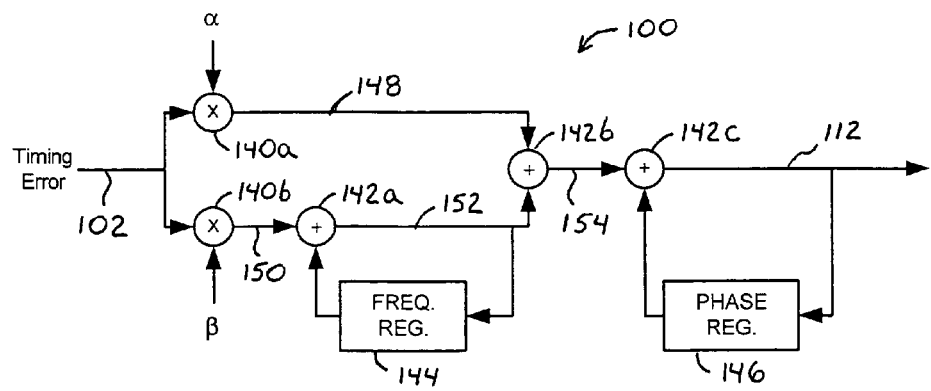
FIG. 10 is a block diagram showing representative components of a timing estimator according to some embodiments of the present invention.

Referring now to FIG. 10, a block diagram is shown of a timing estimator 100, which may be used as the timing estimator 35 in FIG. 1 according to some embodiments of the present invention. The timing estimator 100 receives a timing error 102 from the phase detector 32, and generates a filtered timing error 112 that may be provided to the ITR 27 (FIG. 1) as the clock signal 59 (FIG. 1). The timing estimator 100 includes multiplication blocks 140a and 140b, addition blocks 142a, 142b, and 142c, a frequency register 144, and a phase register 146. The timing error 102 is multiplied by a filter coefficient $\alpha$ to generate a first scaled timing error 148. The timing error 102 is also multiplied by a filter coefficient $\beta$ to generate a second scaled timing error 150, summed with a value of the frequency register 118 to generate an updated timing error 152. The updated timing error 152 and the first scaled timing error 148 are summing by summing block 1115b to generate a frequency adjusted error signal 154. The value of the frequency register is updated based on the updated timing error 152. The frequency adjusted error signal 154 is summed with a value of the phase register 146 to generate the filtered timing error 112. The phase register 146 is updated based on the filtered timing error 112.

The value of the frequency register 144 can be set (e.g., initialized and/or updated) based on the frequency error from the frequency error estimator 34. The value of the phase register can be set (e.g., initialized and/or updated) based on the phase error from the frequency error estimator 34 (e.g., determined by Block 402 in FIG. 4) and/or from the phase detector 32. The filter coefficients $\alpha$ and/or $\beta$ may be adjusted based on the value of the frequency register 144 and/or the value of the phase register 146 being set based on the frequency error and/or the phase error. For example, the filter coefficients $\alpha$ and/or $\beta$ may be reduced to a small value, which may be substantially zero, when the value of the frequency register 144 and/or the value of the phase register 146 is set.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of determining timing for bits in sampled data, the method comprising:
   determining a bit error in the sampled data;
   determining a phase error in the sampled data;
   determining a frequency error of the sampled data based on combining the bit error, the phase error, and a number of bits between first and second locations in the sampled data to determine the frequency error; and
   determining the timing for bits in the sampled data based on the determined frequency error.

2. The method of claim 1, wherein determining a frequency error comprises:
   adding the bit error and the phase error to generate a result; and
   multiplying the result by an inverse of the number of bits between the first and second locations in the sampled data to determine the frequency error.

3. The method of claim 1, wherein determining a bit error comprises:
   detecting a number of bits between the first and second locations in the sampled data; and
   comparing the detected number of bits and a predetermined number of bits between the first and second locations to determine the bit error.

4. The method of claim 3, wherein the sampled data comprises first mark bits and second mark bits, wherein the first location corresponds to a location of the first mark bits, wherein the second location corresponds to a location of the second mark bits, and wherein the predetermined number of bits is based on a predetermined number of bits between the first mark bits and the second mark bits.

5. The method of claim 4, wherein detecting a number of bits between the first and second locations in the sampled data comprises:
   detecting the first mark bits;
   detecting the second mark bits; and
   determining the number of bits between the first and second mark bits.

6. The method of claim 5, wherein at least one of detecting the first mark bits and detecting the second mark bits comprises searching the sampled data for at least one predetermined symbol sequence that corresponds to at least one of the first and second mark bits.

7. The method of claim 5, wherein at least one of detecting the first mark bits and detecting the second mark bits comprises:
   generating synchronous samples from the sampled data;
   filtering the synchronous samples to generate filtered samples; and
   comparing the filtered samples to a threshold value to detect at least one of the first and second mark bits.

8. The method of claim 7, wherein filtering the synchronous samples to generate filtered samples comprises selecting filter coefficients for filtering the synchronous samples based on at least one of the first and second mark bits.

9. The method of claim 8, wherein selecting filter coefficients comprises selecting the filter coefficients based on at least one predetermined symbol sequence that corresponds to at least one of the first and second mark bits.

10. The method of claim 8, wherein filtering the synchronous samples comprises finite-impulse response filtering the synchronous samples to generate the filtered samples, and further comprising selecting filter coefficients for the finite-impulse response filtering based on at least one predetermined symbol sequence that corresponds to at least one of the first and second mark bits.

11. The method of claim 5, wherein at least one of detecting the first mark bits and detecting the second mark bits comprises:
   filtering the sampled data to generate filtered samples; and
   comparing the filtered samples to a threshold value to detect at least one of the first and second mark bits.

12. The method of claim 1, further comprising:
   filtering the sampled data to generate filtered samples using filter coefficients that are generated based on the phase error in the sampled data; and
   comparing the filtered samples to a threshold value to detect at least one of the first and second mark bits in the filtered samples.

13. The method of claim 12, wherein:
   filtering the sampled data comprises finite-impulse response filtering the sampled data to generate the filtered samples using filter coefficients that are generated based on the phase error in the sampled data.

14. The method of claim 1, wherein the sampled data comprises first phase bits and second phase bits, and wherein determining a phase error in the sampled data comprises:
   determining a first phase based on the first phase bits;
   determining a second phase based on the second phase bits; and
   determining the phase error based on the first and second phases.

15. The method of claim 1, wherein determining the timing for bits in the sampled data based on the determined frequency error comprises filtering a timing error signal based on the frequency error and a phase error between bit decisions and synchronous data to determine the timing for bits in the sampled data.

16. The method of claim 1, further comprising:
   reading data from a storage surface of a data storage disk to generate read data, wherein the read data includes first mark bits, second mark bits, and a predetermined number of bits between the first and second mark bits; and
   sampling the read data to generate the sampled data, and
   wherein determining a bit error in the sampled data comprises detecting the first mark bits, detecting the second mark bits, determining a number of bits between the first and second mark bits, and determining the bit error based on the determined number of bits and the predetermined number of bits,
   wherein determining a frequency error comprises combining the bit error, the phase error, and at least one of the determined number of bits between the first and second mark bits and the predetermined number of bits between the first and second mark bits.

17. The method of claim 16, wherein determining a frequency error comprises:
   adding the bit error and the phase error to generate a result; and
   multiplying the result by an inverse of the predetermined number of bits between the first and second mark bits to determine the frequency error.

18. The method of claim 1, further comprising responding to the determined bit timing by adjusting phase of a clock signal that is used to sample asynchronous data read from a disk to generate the sampled data.

19. An apparatus for determining timing for bits in sampled data, the apparatus comprising:
   a frequency error estimator that is configured to determine a bit error in the sampled data, configured to determine a phase error in the sampled data, and configured to determine a frequency error of the sample data based on a combination of the bit error, the phase error, and a number of bits between first and second locations in the sampled data; and
   a timing estimator that is configured to determine the timing for bits in the sampled data based on the determined frequency error.

20. The apparatus of claim 19, wherein the frequency error estimator is configured to add the bit error and the phase error to generate a result, and configured to multiply the result by an inverse of the number of bits between the first and second locations in the sampled data to determine the frequency error.

21. The apparatus of claim 19, wherein the frequency error estimator is configured to detect a number of bits between the first and second locations in the sampled data, and configured to comparing the detected number of bits and a predetermined number of bits between the first and second locations to determine the bit error.

22. The apparatus of claim 21, wherein the sampled data comprises first mark bits that correspond to the first location in the sampled data and second mark bits that correspond to the second location in the sampled data, wherein the frequency error estimator is configured to detect the first and second mark bits in the sampled data, and is configured to detect the number of bits between the first and second mark bits.

23. The apparatus of claim 22, wherein the frequency error estimator is configured to search the sampled data for at least one predetermined symbol sequence that corresponds to at least one of the first and second mark bits.

24. The apparatus of claim 22, wherein the frequency error estimator is configured to generate synchronous samples from the sampled data, configured to filter the synchronous samples to generate filtered samples, and configured to compare the filtered samples to a threshold value to detect at least one of the first and second mark bits.

25. The apparatus of claim 24, wherein the frequency error estimator comprises a mark bit detector, wherein the mark bit detector comprises:
   a zero phase start circuit that generates phase information based on the sampled data;
   an interpolated timing recover circuit that generates synchronous sampled data based on the sampled data and the phase information;
   a filter that is configured to filter the sampled data based on filter coefficients to generate filtered sampled data, wherein the filter coefficients are based on at least one predetermined symbol sequence that corresponds to at least one of the first and second mark bits; and
   a comparator that is configured to compare the filtered sampled data and a threshold value to generate an indication of at least one of the first and second mark bits.

26. The apparatus of claim 24, wherein the frequency error estimator comprises a filter that filters the sampled data based on filter coefficients, wherein the filter coefficients are based on at least one predetermined symbol sequence that corresponds to at least one of the first and second mark bits.

27. The apparatus of claim 26, wherein the filter comprises a finite-impulse response filter with filter coefficients that are based on at least one predetermined symbol sequence that corresponds to at least one of the first and second mark bits.

28. The apparatus of claim 24, wherein the frequency error estimator comprises a mark bit detector, wherein the mark bit detector comprises:
   a zero phase start circuit that generates phase information based on the sampled data;
   a filter coefficient generator that is configured to generate filter coefficients based on the phase information;
   a filter that is configured to filter the sampled data based on the filter coefficients to generate filtered sampled data; and
   a comparator that is configured to compare the filtered sampled data and a threshold value to generate an indication of at least one of the first and second mark bits.

29. The apparatus of claim 19, wherein the frequency error estimator is configured to filter the sampled data based on filter coefficients to generate filtered sampled data, wherein the filter coefficients are generated based on the phase error in the sampled data, and wherein the frequency error estimator is configured to compare the filtered sampled data to a threshold value to detect at least one of first and second mark bits in the filtered sampled data.

30. The apparatus of claim 19, wherein the timing estimator is configured to filter a timing error signal based on the frequency error and the phase error in the sampled data to determine the timing for bits in the sampled data.

31. A computer program product for determining timing for bits in sampled data, the computer program product comprising program code embodied in a computer-readable storage medium, the computer program code comprising:
   program code that is configured to determine a bit error in the sampled data;
   program code that is configured to determine a phase error in the sampled data;
   program code that is configured to determine a frequency error of the sampled data based on combining the bit error, the phase error, and a number of bits between first and second locations in the sampled data to determine the frequency error; and
   program code that is configured to determine the timing for bits in the sampled data based on the determined frequency error.

32. The computer program product of claim 31, further comprising:
   program code that is configured to add the bit error and the phase error to generate a result; and
   program code that is configured to multiply the result by an inverse of the number of bits between the first and second locations in the sampled data to determine the frequency error.

33. The computer program product of claim 31, further comprising:
   program code that is configured to detect a number of bits between the first and second locations in the sampled data; and
   program code that is configured to compare the detected number of bits and a predetermined number of bits between the first and second locations to determine the bit error.

* * * * *